United States Patent [19]

Milburn

[11] 4,065,210

[45] Dec. 27, 1977

[54] VACUUM CONTACT PRINTER

[76] Inventor: Ralph N. Milburn, 3702 Chatham Road, Ellicott City, Md. 21043

[21] Appl. No.: 704,363

[22] Filed: July 12, 1976

[51] Int. Cl.² ............................................. G03B 27/20
[52] U.S. Cl. .................................. 355/91; 248/362; 248/363
[58] Field of Search ................... 355/91, 87, 93, 94, 355/73, 76; 354/292; 248/363, 362; 101/382 MV

[56] References Cited

U.S. PATENT DOCUMENTS

| | | | |
|---|---|---|---|
| 2,919,635 | 1/1960 | Levine et al. | 355/84 |
| 3,007,390 | 11/1961 | Forester et al. | 355/84 |
| 3,335,994 | 8/1967 | Cocito | 248/363 |
| 3,927,942 | 12/1975 | Byers | 355/84 |

*Primary Examiner*—Richard L. Moses
*Attorney, Agent, or Firm*—Morton J. Rosenberg

[57] ABSTRACT

A vacuum contact printer for printing indicia formed on a translucent drawing sheet onto a sensitized sheet material. The contact printer includes a vacuum chamber defining an enclosure having a planar upper wall with vertically directed through perforations. Secured to the upper wall of the vacuum chamber is a screen element which is pulled taut and located in fixed relation to an upper surface of the upper wall of the vacuum chamber. A cloth member is positioned over the screen member and secured to the frame of the vacuum chamber.

In order to provide an image, the drawing sheet and sensitized sheet material are inserted over the cloth member and sandwiched between a transparent polyester film and the cloth. A light fixture is linearly driven across the upper surface of the vacuum chamber and the various sheet mounting mechanisms in close proximity thereof to permit light to pass through the translucent drawing sheet onto the sensitized sheet material. Absorption of the light by the indicia provides for an image to be transferred to the sensitized paper or other sensitized material. The light fixture is driven in substantially linear and reversible manner to provide for even distribution of the light across the drawing sheet and the sensitized sheet material. The driving mechanism is provided by a motor which drives a pair of endless belts linearly displaceable on opposing transverse sides of the contact printer.

19 Claims, 5 Drawing Figures

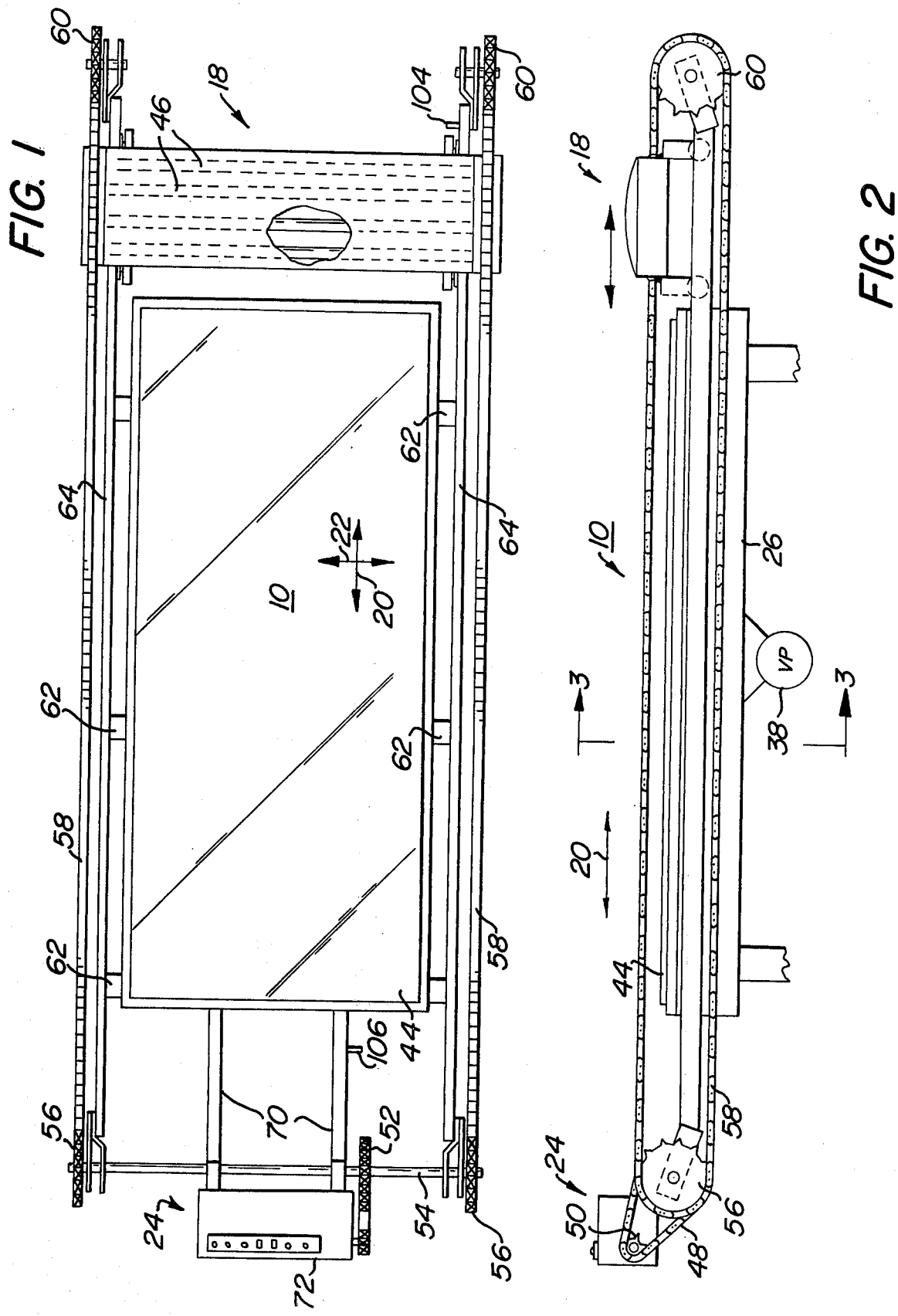

VACUUM CONTACT PRINTER

BACKGROUND OF THE INVENTION

1. Field of the Invention

This invention relates in general to photocopying systems. In particular, this invention pertains to contact printers for transferring indicia from a drawing sheet to a sensitized sheet material. Still further, this invention relates to a vacuum contact printer for maintaining the drawing sheet and the sensitized sheet material in contiguous and adjacent relation to an upper surface of a vacuum chamber. More particularly, this invention pertains to a vacuum contact printer where the pressure drop loads caused by the vacuum chamber are distributed over a wide area of the drawing sheet and the sensitized sheet material in order to minimize any indentations or other contour anomolies which may be present due to pressure drop force loadings on the sheets. Additionally, this invention relates to a vacuum contact printer minimizing distortions in the transfer of the indicia to the sensitized sheet material.

2. Prior Art

Contact printers for transferring indicia from a drawing sheet to a sensitized sheet material are known in the art. However, some of these prior art contact printers when utilizing vacuum chambers have caused indentations or other contour anomilies to exist in the drawing and sensitized sheets thereby causing unwanted and non-clear images to be transferred to the sensitized sheet material.

Additionally, in some prior contact printers the drawing sheet and sensitized sheets were moved relative to the light source thereby causing complexity in the various mechanisms associated with the contact printer. Still further, in other prior art vacuum contact printers, the mechanism for driving the light source through a predetermined distance was expensive to provide and costly in manufacturing.

Still further, in some other prior art printers the work face was not positioned in a face up location. This did not permit the user to position the work without movement of the work sheets.

In other prior art printers, the light source was substantially displaced from the sensitized material and resulted in possible halation effects which caused derrogatory transference of the indicia pattern.

SUMMARY OF THE INVENTION

A contact printer for printing indicia formed on a translucent drawing sheet to a photo-senstitized sheet. The contact printer includes a light mechanism for passing light consecutively through the drawing sheet to the photo-sensitized sheet. A light drive mechanism linearly displaces the light mechanism in a plane parallel to the drawing and photo-sensitized sheets. A vacuum chamber having a vacuum pump for maintaining a pressure drop from an external to an internal enviornment of the vacuum chamber is positioned below the drawing and sensitized sheet wherein the sheets are mounted adjacent to an upper wall of the vacuum chamber. A sheet mounting mechanism is provided for securing the sheets to the upper wall in a fixed planar relation. The sheet mounting elements are secured to the upper wall of the vacuum chamber for distributing pressure drop load forces acting on the sheets over an extended surface area of the sheets.

BRIEF DESCRIPTION OF THE DRAWINGS

FIG. 1 is a plane view of the vacuum contact printer;

FIG. 2 is an elevation view of the vacuum contact printer;

DESCRIPTION OF THE PREFERRED EMBODIMENTS

Figure 3:
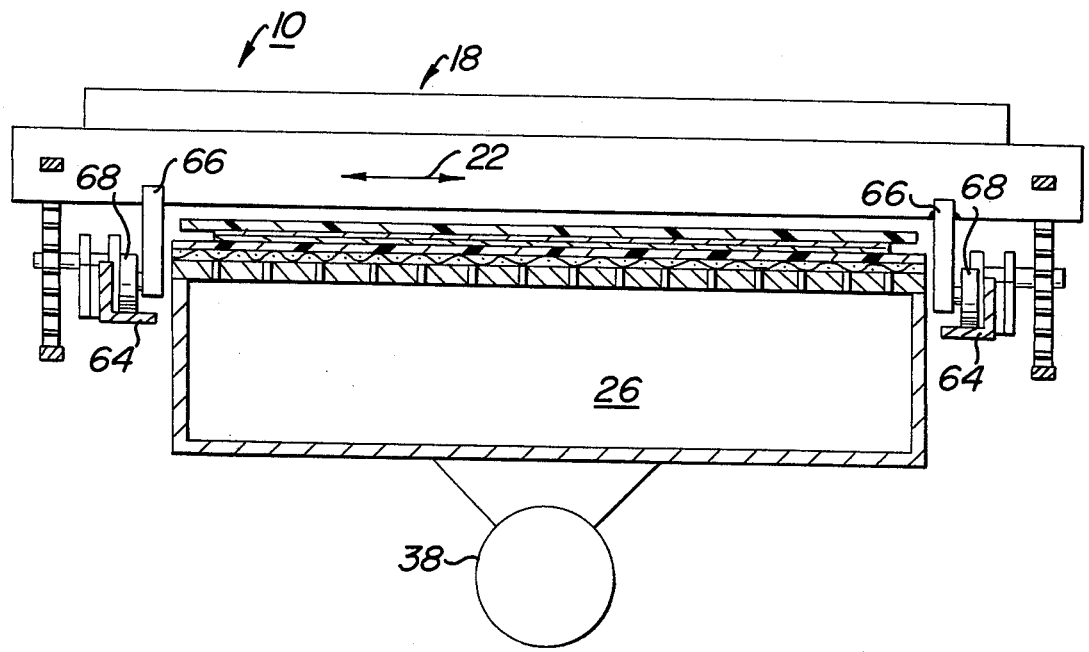
FIG. 3 is a sectional view of the vacuum contact printer taken along the section lines 3—3 of FIG. 2.
Figure 4:
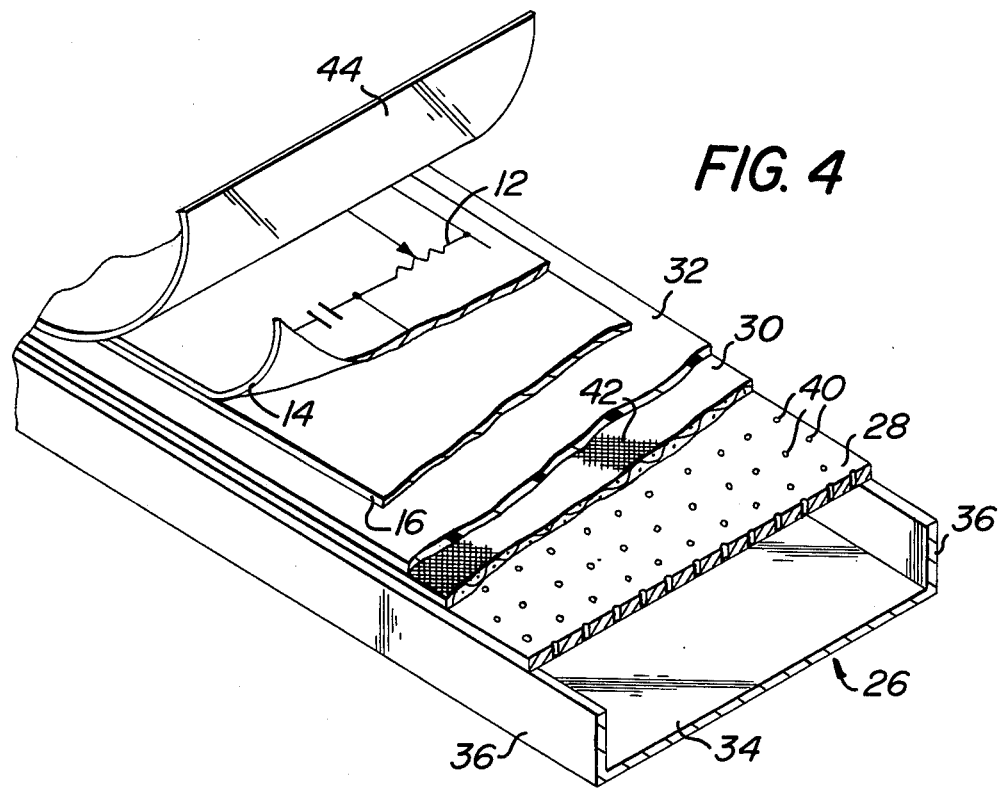
FIG. 4 is a perspective partially cut away view of the vacuum chamber and the sheet mounting elements provided for the vacuum contact printer; and, FIG. 5 is an electrical schematic diagram of the vacuum contact printer.

Referring now to FIGS. 1–4 there is shown contact pringer 10 for transferring indicia 12 from drawing sheet 14 to a mated and interfacing photo-sensitized sheet 16 as is shown in FIG. 4. In overall concept, vacuum contact printer 10 maintains drawing sheet 14 and photo-sensitized sheet 16 in mated, planar relation as well as in contiguous contact through use of vacuum pump pressure drops and particular sheet mounting elements as will be detailed in the following paragraphs.

The general operating principle includes light being transmitted through drawing sheet 14 which has a relatively high amount of light transmissability. On drawing sheet 14 there is provided indicia 12 which is absorptive of the light transmission and does not allow the light to be transmitted to photo-sensitive sheet 16. The area which is absorptive in nature, namely indicia 12, blocks the light transmission and provides an image to be formed on sensitized sheet 16. Vacuum contact printer 10 has a light mechanism 18 which is driven linearly in a longitudinal direction defined by directional arrow 20 throughout the extension of drawing sheet 14 and sensitized sheet 16 mounted on vacuum contact printer 10. Light fixture or mechanism 18 is driven in reversible longitudinal direction 20 by light drive mechanism 24 which linearly displaces light fixture 18 in a plane substantially parallel to both drawing sheet 14 and sensitized sheet 16. Maintenance of sheets 14 and 16 in contiguous and registered position each with respect to the other is provided by pressure drop or vacuum chamber 26 acting in cooperation with sheet mounting elements 28, 30 and 32 as will be described in the following paragraphs.

Vacuum chamber 26 may be formed of floor panel 34 secured to side walls 36 as is clearly shown in FIG. 4. Mounted below and connected through an orifice to floor panel 34 is vacuum pump 38 for maintaining a pressure drop from some external atmosphere to an internal enviornment of vacuum chamber 26. Vacuum pump 38 may be of a standard type used in vacuum cleaners to generate sufficient pressure drop such that drawing sheet 14 and sensitized sheet 16 are able to be maintained in contact with upper wall or peg board 28 of contact printer 10. It has been found that a pressure drop of approximately 0.5 inches of water is in registered relation, however such is not critical to the inventive concept as is herein developed.

Vacuum chamber 26, as is seen in FIG. 4, is provided with upper wall 28 which is generally planar in contour. Additionally, upper wall 28 is porous in nature for providing sufficient pressure drop from the external to the internal enviornment from vacuum chamber 26 such that sheets 14 and 16 are maintained in contiguous relation thereto. The porosity of upper wall or peg board 28 is provided by a first plurality of openings 40 which pass through peg board 28 in a through manner and in a vertical direction to a plane formed by directional arrows 20 and 22.

Thus, openings 40 pass through upper wall 28 in a direction substantially normal to the planar contour of upper wall 28. Although not important to the inventive concept as is herein developed, the first plurality of openings 40 may have a diameter approximately equal to ¼ of an inch and are spaced each from the other in a rectangular matrix approximately 2 inches between an opening 40 and an adjacent next consecutive opening. Peg board or upper wall 28 may be mounted on side wall frames 36 by adhesive, bolting, or some like mechanism not important to the inventive concept as is herein developed.

One of the problems developed in contact printing apparatus of this nature is that pressure drops developed within vacuum chamber 26 cause indentations and generally non-planar contact in both drawing sheet 14 and sensitized sheet 16 when such are mounted in fixed relation for transference of indicia 12 from sheet 14 to sheet 16. In order to disburse the loads applied to sheets 14 and 16, load distribution member 30 is secured in fixed relation to upper wall 28 of vacuum chamber 26. Load distribution member 30 is positionally located adjacent and contiguous an upper surface of peg board 28 of vacuum chamber 26. Member 30 may be mounted through adhesion, nailing, bolting, or some like mechanism. Member 30 may be formed of a wire screen which is pulled taut over the upper surface of upper wall 28.

Thus, wire screen 30 includes a second plurality of through openings 42 providing for the mesh size of screen 30. One mesh size which has been successfully utilized is wire screening having a 100 mesh size opening. Of importance is that second plurality of through openings 42 are displaced each from the other a distance less than the displacement distance of the first series of openings 40 formed in peg board 28. This allows for the wire structure of screen 30 to absorb the loads applied to sheets 14 and 16 and disburse such loads without causing an indentation without each of sheets 14 and 16. Each of second plurality of through openings 42 formed in wire screen 30 have a cross sectional area less than the cross sectional area of first plurality of through openings 40. Screen 30 is pulled into a taut position in order that there be a planar relation between screen 30 and an upper surface of wall 28.

Sheet contact member 32 is adjacently positioned to an upper surface of load distribution member 30 and is secured in fixed relation to either member 30 or to upper wall 28 by stapling, adhesion, or some like technique. Sheet contact member or cloth layer 32 is substantially continuous in nature and is formed of a porous material in order that the pressure drop maintained by vacuum pump 38 may be transmitted therethrough. Sheet contact member 32 may be formed of woven nylon in order to provide a smooth surface on which to place the material to be contacted, yet include the porosity necessary such that drawing sheet 14 and sensitized sheet 16 may be mounted in fixed relation to contact printer 10.

Sensitized paper or sheet 16 is then placed on top of cloth member 32 with drawing sheet 14 positionally located on an upper surface of photo-sensitized sheet 16. The surface area of drawing sheet 14 is greater than sheet 16 in order that sheet 14 has an uninterrupted area adjacent cloth member 32. This allows for both sheets 14 and 16 to be adhered to member 32.

Transparent layer 44 covers both drawing sheet 14 and sensitized sheet 16 as is clearly evident from FIG. 4. Transparent layer 44 may be a thin sheet of clear polyester film attached to contact printer 10 on one end thereof and adapted to lie in contiguous relation over sheets 14 and 16. Transparent layer 44 allows light from light mechanism 18 to be transmitted therethrough but blocks or otherwise impedes the air medium from being pulled through an unused area.

Where transparent layer 44 would not completely cover peg board or upper wall 28, there would be a tendency for the air being drawn to pass through the path of least resistance and there by minimize the effects of vacuum pump 38 and chamber 26. Thus, in operation, drawing sheet 14 and photo-sensitized sheet 16 are sandwiched between transparent film layer 44 and sheet contact member 32 for maintenance of sheets 14 and 16 in contiguous, planar relation each to the other in order to provide an optimized transference of indicia 12 from sheet 14 to sensitized sheet 16.

Light fixture or mechanism 18 includes a standard flourescent fixture which in the embodiment shown, includes four lamps 46 having an extension in transverse direction 22 of approximately 48 inches. As will be shown, light fixture 18 is linearly displaceable with respect to vacuum chamber 26 in a reversible longitudinal direction 20 adjacent to an upper surface of transparent layer 44 and in close proximity thereto.

Light driving mechanism 24 includes chain pulley 48 connected to a reversible motor through motor gear 50 rotatably mounted on a motor shaft. Chain 48 is connected to drive gear 52 fixedly mounted to transverse shaft 54 as is seen in FIG. 1. Transverse drive shaft 54 extends in a transverse direction 22 between a pair of transversely displaced light drive gears or pulleys 56. Each of light drive gears 56 includes socket extensions extending in a radial direction therefrom to interface and interfit with opposing endless chain belts 58. Thus, actuation of motor gear 50 by the reversible motor causes rotational displacement of drive gear 52 through chain belt 48. The rotation of drive gear 52 being fixedly secured to drive shaft 54 causes light drive gears 56 to be rotated and displace opposing endless chain belts 58 in a linear manner in longitudinal direction 20 on an upper and lower surface thereof.

Opposing endless chain belts 58 are fixedly attached to lamp fixture 18 on opposing transverse ends thereof through riveting, bolting, or some like technique. Thus, as the upper portion of each of chain belts 58 is displaced in a linear direction 20, light fixture 18 is correspondingly driven through a similar displacement. Driven gears 60 being of the same diameter as light drive gears 56 are mounted in transverse opposing manner across contact printer 10 in order to maintain linear displacement of light mechanism 18 in a substantially horizontal plane.

Extension members 62 pass in transverse direction 22 from vacuum chamber 26 and are connected to opposing tracks 64 which pass in longitudinal direction 20. Light fixture 18 includes downwardly extending elements 66 which are interfaced with tracks 64 through rollers 68 as is seen in FIG. 3. Thus, rollers 68 which are rotatably displaceable with respect to downwardly extending element 66 through a connecting shaft and maintains an interface between light fixture 18 and tracks 64. In this manner, light fixture 18 is guided in moveable but in a directionally fixed manner throughout the linear displacement of light fixture 18.

Light drive mechanism 24 is mounted on a shelf which is connected to vacuum chamber 26 by a pair of arm members 70. Motor gear 50 is rotated by a standard 1/50–1/100 horsepower DC variable speed motor mounted on the shelf. Shelf 72 maintains the motor and the standard circuits from a main power switch and all systems are powered by a standard 120 volt electrical service. The motor is connected to the vacuum pump 38 and allows air to be pulled from vacuum chamber 26. The drive motor circuit includes a variable transformer in order to fix the speed of the drive motor, a rectifier, and a double throw switch for changing the direction of rotation of endless chain blets 58 in a manner as has hereinbefore been described. Light system or mechanism 18 consists of four florescent lamps with two ballasts for each of the four lamps with a standard florescent light circuit.

It is to be understood that lamps 46 are in close proximity to sensitized sheet 16 in the order of ¼ inch to ½ inch. Thus the light is transmitted in a substantially collimated fashion. This allows the possible use of a plurality of translucent sheets 14.

Figure 5:
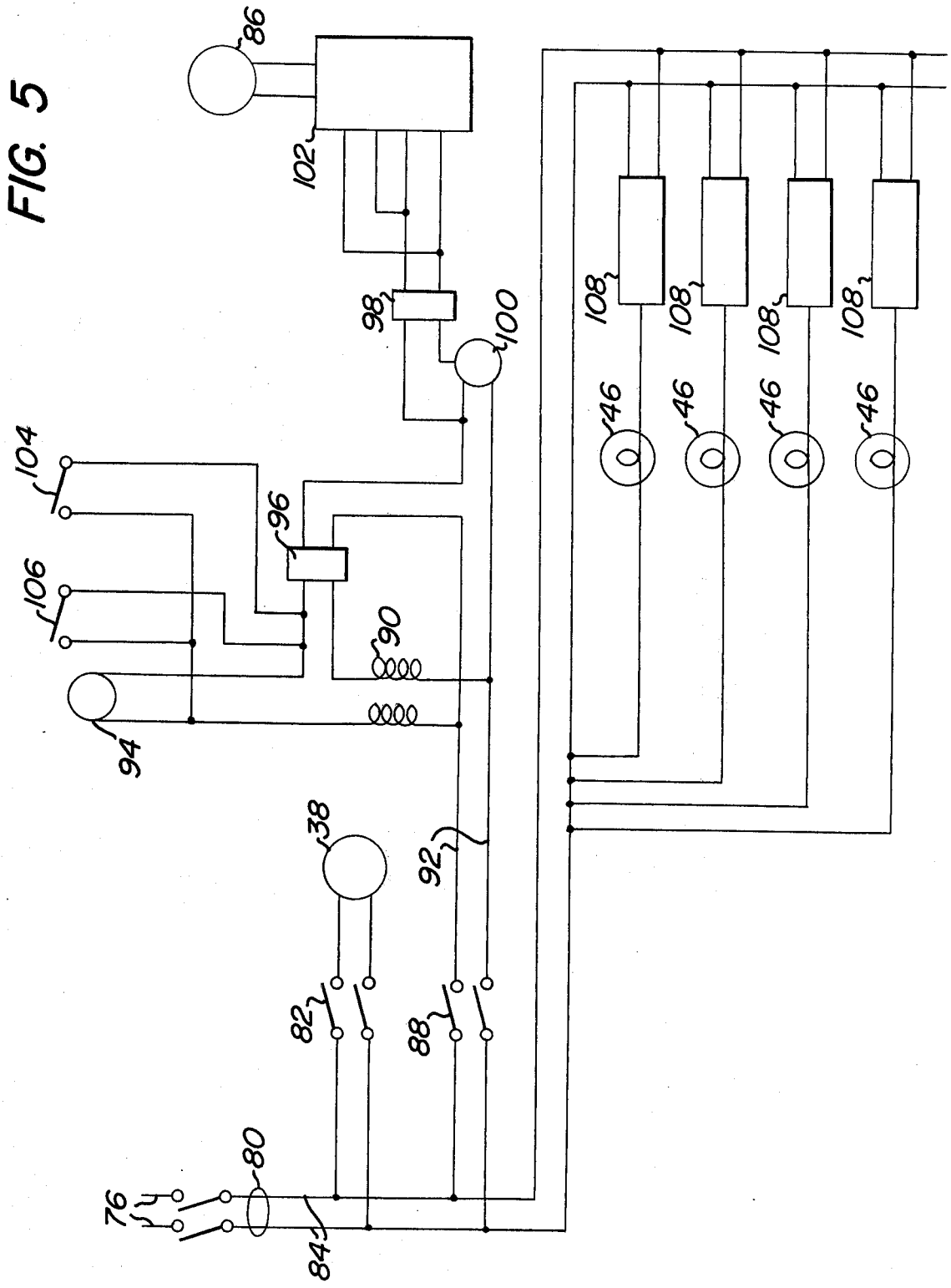

Referring now to FIG. 5, there is shown a schematic diagram of the basic electrical system for vacuum contact printer 10. Printer leads 76 are connected to a standard 120 volt AC outlet. Main power switch 78 is placed in series with pilot light 80 and is manually operable. Vacuum pump 38 is connected in parallel with line 84 through manually actuatable vacuum pump switch 82 as is shown. Thus closure of power switch 78 and switch 82 causes actuation of vacuum pump 38.

Drive motor 86 is coupled to input line 84 through manual motor switch 88 as shown. The system is a 12 volt system, therefore transformer 90 is coupled to line 92. Push button switch 94 closes relay 96 to permit current to flow through the drive circuit.

When relay 96 is actuated, one-half the signal passes through selenium chip rectifier 98 while the other half of the signal passes to variable transformer 100. The output line of rectifier 98 is 120 volt D.C.

The signal from rectifier 98 passes to double pole double throw switch 102. When limit switches 104 and 106 are actuated, switch 102 causes reverse of drive motor 86 to provide displacement of light mechanism 18. Ballast 108 and lamps 46 are coupled to line 84 through lamp switch 110 which is manually operated. In this manner, vacuum pump 38, lamps 46 and drive motor 86 may be actuated. Ballast 108 is a standard 40 watt ballast manufactured by Universal Manufacturing Co. and fluorescent lamps 46 are standard 65 watt Sylvania 40T 12 SDZ lamps.

What is claimed is:

1. A contact printer for printing indicia formed on a translucent drawing sheet on a photo-sensitized sheet, comprising:
   a. light means for passing light consecutively through said drawing sheet to said photo-sensitized sheet;
   b. light drive means for linearly displacing said light means in a plane parallel to said drawing and photo-sensitized sheets;
   c. vacuum chamber having a vacuum pump for maintaining a pressure drop from an external to an internal environment of said vacuum chamber, said sheets being mounted adjacent an upper wall of said vacuum chamber, said wall having a first plurality of openings passing therethrough; and,
   d. sheet mounting means for securing said sheets to said upper wall in fixed planar relation, said sheet mounting means being secured to said upper wall of said vacuum chamber for distributing pressure drop load forces acting on said sheets over an extended surface area of said sheets, said sheet mounting means including load distribution means secured to said upper wall of said vacuum chamber, said load distribution means having a second plurality of through openings passing therethrough, said sheet mounting means further including sheet contact means adjacently positioned to an upper surface of said load distribution means, said sheet contact means being porous.

2. The contact printer as recited in claim 1 where said vacuum chamber upper wall is planar in contour.

3. The contact printer as recited in claim 2 where said vacuum chamber upper wall is porous for providing said pressure drop from said external to said internal enviornment of said vacuum chamber.

4. The contact printer as recited in claim 3 where said vacuum chamber upper wall is formed of pegboard.

5. The contact printer as recited in claim 4 where said load distribution means is positionally located adjacent and contiguous an upper surface of said upper wall of said vacuum chamber.

6. The contact printer as recited in claim 5 where said vacuum chamber upper wall is porous having a first plurality of through openings passing therethrough, said first plurality of openings being positionally formed a predetermined distance each from the other.

7. The contact printer as recited in claim 1 where said second plurality of through openings are displaced each from the other a distance less than a displacement distance of said first through openings.

8. The contact printer as recited in claim 1 where each of said second plurality of through openings includes a cross-sectional area less than a cross-sectional area of said first plurality of through openings.

9. The contact printer as recited in claim 1 where said load distribution means includes a screen mesh member secured to said vacuum chamber in contiguous planar relation.

10. The contact printer as recited in claim 1 where said sheet contact means is substantially continuous.

11. The contact printer as recited in claim 10 where said sheet contact means is a cloth material.

12. The contact printer as recited in claim 11 where said drawing and photo-sensitized sheets are mounted to an upper surface of said sheet contact means.

13. The contact printer as recited in claim 12 where said sheet mounting means includes a substantially transparent film element, said drawing and photo-sensitized sheets being sandwiched between said film element and said sheet contact means.

14. The contact printer as recited in claim 13 where said film element is a clear polyester film element.

15. The contact printer as recited in claim 1 where said light means includes a light fixture linearly displaceable with respect to said vacuum chamber in a longitudinal direction adjacent an upper surface of said sheet mounting means.

16. The contact printer as recited in claim 15 where said light means is a fluorescent fixture extending in a transverse direction with respect to said displacement direction.

17. The contact printer as recited in claim 15 where said light drive means includes:

a. motor means; and,
b. at least one endless belt passing in said longitudinal direction, said endless belt secured to said light fixture and connected to said motor means for linearly moving said belt.

18. The contact printer as recited in claim 17 including a pair of track members on opposing transverse sides of said vacuum chamber, said track members extending in said longitudinal direction, said light fixture contacting said tracks on opposing transverse sides of said vacuum chamber.

19. The contact printer as recited in claim 18 including roller elements rotatably secured to opposing transverse ends of said light fixture for contacting said track members.

* * * * *